United States Patent
Jung

(10) Patent No.: US 12,395,498 B2
(45) Date of Patent: Aug. 19, 2025

(54) VEHICLE NETWORK SYSTEM AND MESSAGE TRANSMISSION AND RECEPTION METHOD THEREOF

(71) Applicants: Hyundai Motor Company, Seoul (KR); Kia Corporation, Seoul (KR)

(72) Inventor: Ho Jin Jung, Bucheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 91 days.

(21) Appl. No.: 18/480,281

(22) Filed: Oct. 3, 2023

(65) Prior Publication Data
US 2024/0364709 A1    Oct. 31, 2024

(30) Foreign Application Priority Data
Apr. 26, 2023   (KR) .................. 10-2023-0054692

(51) Int. Cl.
*H04L 9/40* (2022.01)
*H04L 9/00* (2022.01)
*H04L 12/40* (2006.01)

(52) U.S. Cl.
CPC ............ *H04L 63/126* (2013.01); *H04L 12/40* (2013.01); *H04L 63/0876* (2013.01); *H04L 63/1441* (2013.01); *H04L 2012/40215* (2013.01); *H04L 2012/40273* (2013.01)

(58) Field of Classification Search
CPC ... H04L 63/126; H04L 12/40; H04L 63/0876; H04L 63/1441; H04L 2012/40215; H04L 2012/40273; H04L 63/123; H04L 12/40039; H04L 9/00
See application file for complete search history.

(56) References Cited

U.S. PATENT DOCUMENTS

| | | | |
|---|---|---|---|
| 10,291,583 B2 * | 5/2019 | Yan | H04L 63/0227 |
| 10,834,206 B2 | 11/2020 | Acharya et al. | |
| 10,870,412 B2 | 12/2020 | Zorin et al. | |
| 11,025,428 B2 | 6/2021 | Knopf | |
| 11,569,984 B2 | 1/2023 | Ujiie et al. | |
| 2015/0020152 A1 * | 1/2015 | Litichever | G06F 21/606 726/1 |
| 2018/0189483 A1 * | 7/2018 | Litichever | H04L 69/22 |
| 2018/0191738 A1 * | 7/2018 | David | H04L 63/105 |
| 2018/0205703 A1 * | 7/2018 | Grau | H04L 63/0209 |
| 2018/0262466 A1 * | 9/2018 | Atad | H04L 63/0245 |
| 2018/0300477 A1 * | 10/2018 | Galula | H04L 63/1416 |
| 2019/0026103 A1 * | 1/2019 | Van Der Maas | G06F 11/0784 |
| 2019/0098047 A1 * | 3/2019 | Giannopoulos | H04L 63/1483 |
| 2019/0207915 A1 | 7/2019 | Schaap | |
| 2019/0394089 A1 * | 12/2019 | Barrett | H04L 41/0816 |
| 2020/0204395 A1 * | 6/2020 | Takahashi | H04L 63/1425 |

(Continued)

FOREIGN PATENT DOCUMENTS

| | | |
|---|---|---|
| CN | 115150115 | 10/2022 |
| KR | 10-2022-0135899 | 10/2022 |

*Primary Examiner* — Darren B Schwartz
(74) *Attorney, Agent, or Firm* — Fish & Richardson P.C.

(57) ABSTRACT

A message transmission and reception method includes determining whether a message identifier (ID) of an encoded message exists in a blocking table for blocking messages when receiving the encoded message from a first controller, and transmitting the encoded message to the second controller when the message ID of the encoded message does not exist in the blocking table.

18 Claims, 3 Drawing Sheets

(56) References Cited

U.S. PATENT DOCUMENTS

2020/0412756 A1\* 12/2020 Kishikawa ............ B60R 16/023
2021/0176259 A1\*  6/2021 Park .................... H04L 63/1408
2021/0203682 A1    7/2021 Bajpai
2021/0288801 A1\*  9/2021 Kulkarni ............... H04L 9/0631
2022/0159016 A1\*  5/2022 Bennett ............... H04L 63/1416
2022/0232383 A1\*  7/2022 Monteuuis ............ H04W 12/61

\* cited by examiner

VEHICLE NETWORK SYSTEM AND MESSAGE TRANSMISSION AND RECEPTION METHOD THEREOF

CROSS REFERENCE TO RELATED APPLICATION

The present application claims priority to Korean Patent Application No. 10-2023-0054692, filed Apr. 26, 2023, the entire contents of which are incorporated herein for all purposes by this reference.

TECHNICAL FIELD

The present disclosure relates to a vehicle network, and, more particularly, to a vehicle network system and a message transmission and reception method thereof.

BACKGROUND

A vehicle may include an electronic control unit and multimedia devices to manage driving and supplementary functions. However, as the number of these components grows, so does the potential security risk.

In particular, within the context of vehicles, an electronic control unit (ECU) is vulnerable to arbitrary operation, transmitting signals to the ECU via a Controller Area Network. This susceptibility stems from external hacking and similar threats, potentially exposing vehicles and drivers to severe risks and accidents.

Consequently, the exploration of implementing an Intrusion Detection System (IDS) as an initial IT security measure within vehicle gateways is underway. This system involves application of a Message Authentication Code (MAC) to certain messages for the purpose of verifying message integrity. This is not limited to Integrated Data Processing (IDP) of a central processing type, each controller adopts this approach.

When a manipulated or falsified message reaches a controller, the controller can reject the altered message by cross-referencing the MAC value. However, since a message subjected to MAC authentication is not scrutinized at a gateway terminal, this poses the issue that a manipulated message can be received and processed intact, unless the receiving controller possesses MAC verification capabilities.

Addressing this concern, a solution involves embedding a Vehicle Shared Key (VSK) within both individual controller and gateways. This approach entails evaluating integrity by employing the VSK to compute a MAC for messages exclusively designated for MAC verification at the gateway. Consequently, messages failing the verification process are blocked from being routed further.

However, conducting integrity verification across an extensive volume of messages transmitted and received at across numerous domains could potentially exert a negative impact, especially as the number controllers within vehicles experiences rapid growth.

Thus, within the scope of the present disclosure, there arises a necessity for a technology capable of minimizing gateway routing latency while concurrently preventing the routing of counterfeit messages. This could be achieved, for instance, by transmitting feedback from a controller to the gateway.

SUMMARY

The present disclosure is directed to a vehicle network system and a message transmission and reception method thereof, the system and method being able to minimize routing latency of a gateway and preclude routing for forged messages by transmitting feedback to the gateway from a controller.

The present disclosure is also directed to a vehicle network system and a message transmission and reception method thereof, the system and method being able to quickly filter out forged messages even without directly performing integrity verification at a gateway.

According to one aspect, a message transmission and reception method that is performed at a gateway that receives a message from a first controller and transmits the message to a second controller in a vehicle network includes: determining whether a message identifier (ID) of an encoded message exists in a blocking table for blocking messages when receiving the encoded message from the first controller; and transmitting the encoded message to the second controller when the message ID of the encoded message does not exist in the blocking table.

The message transmission and reception method may further include: receiving a feedback message related to the encoded message from the second controller; and updating the blocking table on the basis of the feedback message.

The blocking table may include message identifier (ID) and state fields.

When the state filed has a value of 'Block' and the identifier (ID) of the encoded message coincides with an ID indicated by the message ID field, the encoded message may be blocked without being routed to the second controller.

The blocking table may be stored only during a current driving cycle of a vehicle and may be reset when the current driving cycle is ended or a next driving cycle is started.

The feedback message may include at least one or more of a field indicating that the feedback message is a verification feedback message, a field indicating an identifier (ID) of the encoded message, a field including a flag for the result of verifying the encoded message, or a field including a Message Authentication Code (MAC) value for the feedback message, or a combination thereof.

The feedback message may have a size of 12 bytes, the field indicating that the feedback message is a verification feedback message may have a size of 1 byte, the field indicating an ID of the encoded message may have a size of 2 bytes, the field including a flag for the result of verifying the encoded message may have a size of 1 byte, and the field including a MAC value for the feedback message may have a size of 8 bytes.

When the field indicating that the feedback message is a verification feedback message has a value of '11', the field may indicate that the feedback message is a verification feedback message.

The field indicating an ID of the encoded message may include ID information for a message that has failed in verification as the result of verification by the second controller.

The field including a flag for the result of verifying the encoded message may have a value of 'FF' or '00', the 'FF' may indicate that the encoded message has failed in verification as the result of normally verifying the encoded message, and the '00' may indicate that an error has been generated during verifying the encoded message.

Meanwhile, a gateway that receives a message from a first controller and transmits the message to a second controller in a vehicle network includes: a communication unit configured to receive an encoded message from the first controller and transmit the encoded message to the second controller when a message ID of the encoded message does not exist in a blocking table; and a processor configured to determine whether the message ID of the encoded message exists in a blocking table for blocking messages.

The communication unit may receive a feedback message related to the encoded message from the second controller, and the processor may update the blocking table on the basis of the feedback message.

The blocking table may include message identifier (ID) and state fields.

When the state filed has a value of 'Block' and the identifier (ID) of the encoded message coincides with an ID indicated by the message ID field, the encoded message may be blocked without being routed to the second controller.

The blocking table may be stored only during a current driving cycle of a vehicle and may be reset when the current driving cycle is ended or a next driving cycle is started.

The feedback message may include at least one or more of a field indicating that the feedback message is a verification feedback message, a field indicating an identifier (ID) of the encoded message, a field including a flag for the result of verifying the encoded message, or a field including a Message Authentication Code (MAC) value for the feedback message, or a combination thereof.

The feedback message may have a size of 12 bytes, the field indicating that the feedback message is a verification feedback message may have a size of 1 byte, the field indicating an ID of the encoded message may have a size of 2 bytes, the field including a flag for the result of verifying the encoded message may have a size of 1 byte, and the field including a MAC value for the feedback message may have a size of 8 bytes.

When the field indicating that the feedback message is a verification feedback message has a value of '11', the field may indicate that the feedback message is a verification feedback message.

The field indicating an ID of the encoded message may include ID information for a message that has failed in verification as the result of verification by the second controller.

The field including a flag for the result of verifying the encoded message may have a value of 'FF' or '00', the 'FF' may indicate that the encoded message has failed in verification as the result of normally verifying the encoded message, and the '00' may indicate that an error has been generated during verifying the encoded message.

According to various implementations of the present disclosure described above, it is possible to quickly filter out forged messages without performing integrity verification at a gateway.

Further, it is possible to quickly filter out forged messages even without performing integrity verification at a gateway.

The effects of the present disclosure are not limited to the effects described above and other effects can be clearly understood by those skilled in the art from the following description.

DETAILED DESCRIPTION

Figure 1:
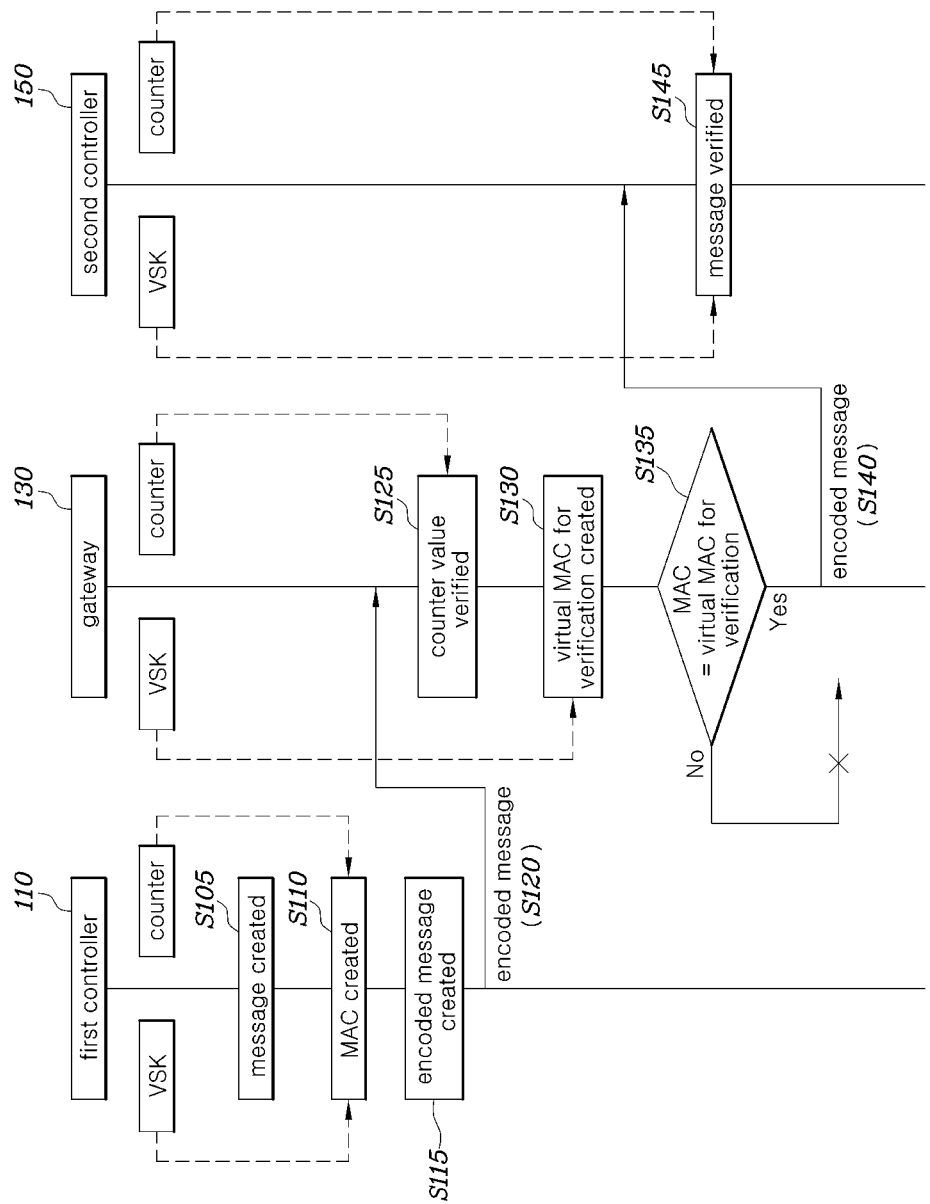
FIG. 1 is a diagram illustrating an example of a message transmission and reception method that is performed in a conventional vehicle network system.

FIG. 1 shows an example of a message transmission and reception method that is performed in a conventional vehicle network system.

Referring to FIG. 1, a first controller 110 creates a message to be transmitted to a second controller 150 (S105) and creates a Message Authentication Code (MAC) on the basis of a Vehicle Shared Key, which is a shared key that all of the electronic control units in a vehicle share, and a counter (S110).

Further, the first controller 110 creates an encoded message on the basis of the message created in step S105 and the MAC created in step S110 (S115) and transmits the created encoded message to a gateway 130 (S120).

In this case, the encoded message may be a payload control MAC message obtained by adding a counter value and the created MAC to a payload in the created message.

When receiving the encoded message from the first controller 110 (S120), the gateway 130 verifies the counter value in the encoded message (S125) and creates a virtual MAC for verification on the basis of the encoded message received from the first controller 110 and the Vehicle Shared Key (VSK) (S130). When the virtual MAC for verification is created, the gateway 130 determines whether the MAC in the encoded message received from the first controller 110 and the virtual MAC for verification coincide (S135), and transmits the encoded message to the second controller 150 when the MAC in the received encoded message and the virtual MAC for verification coincide (S140).

When receiving the encoded message from the gateway 130 (S140), the controller 150 verifies the received encoded message on the basis of the VSK and the counter (S145).

According to this message transmission and reception method, MAC verification is performed on all of encoded messages at a gateway terminal, and routing of messages is allowed only when MAC verification succeeds. Accordingly, an excessive load is applied to the gateway and high delay is added in proportion to the number of messages that are routed.

Hereafter, a message transmission and reception method according to the present disclosure that can maintain security while minimizing latency by solving the above defect is described.

Figure 2:
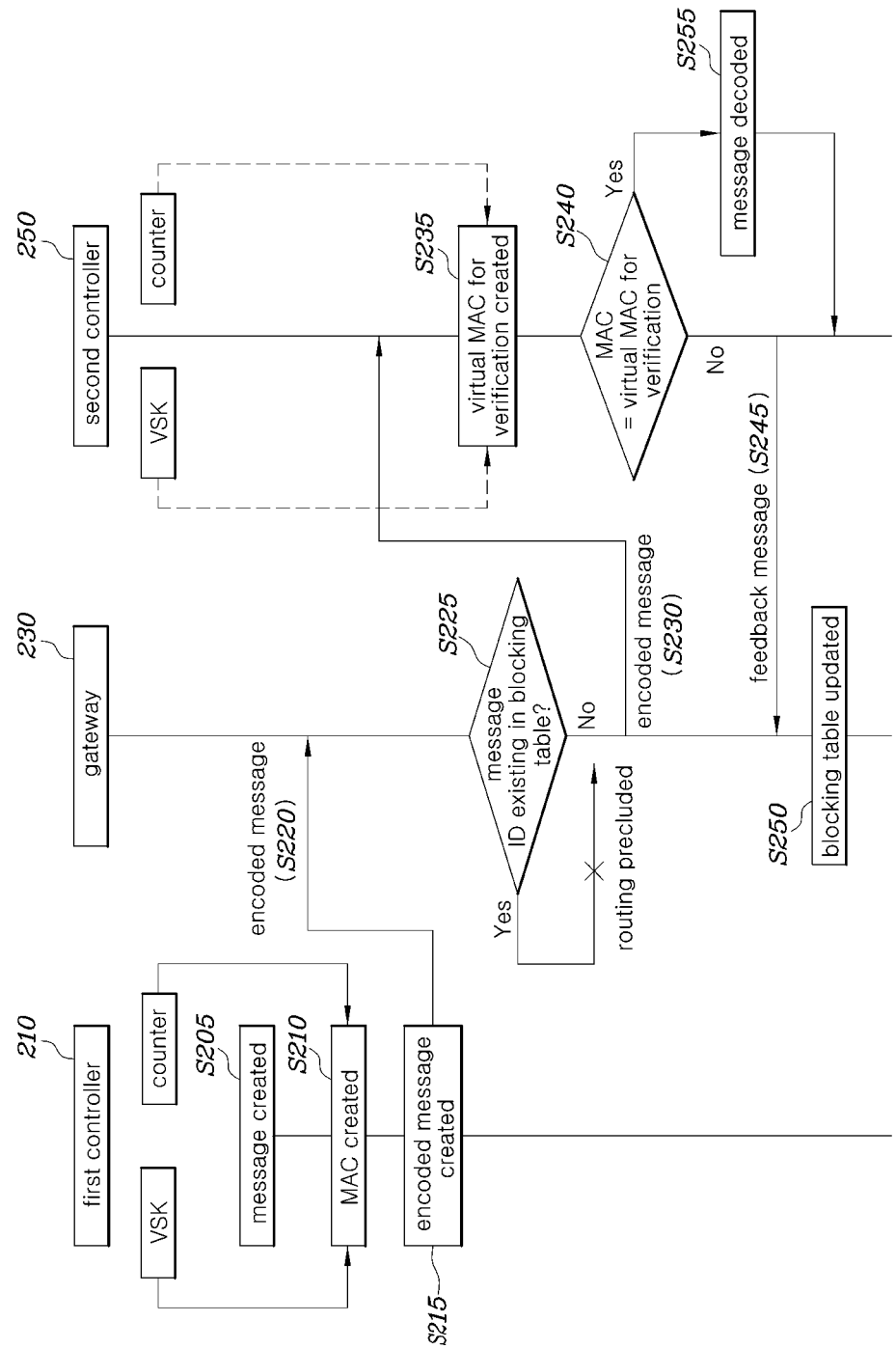
FIG. 2 is diagram illustrating an example of a message transmission and reception method of a vehicle network system.

FIG. 2 shows a message transmission and reception method of a vehicle network system.

In the specification, a first controller 210 may be defined as a message transmission controller and a second controller 250 may be defined as a message reception controller.

Further, a gateway 230 may be a Central Gateway (CGW).

Referring to FIG. 2, a first controller 210 creates a message to be transmitted to a second controller 250 (S205) and creates a Message Authentication Code (MAC) on the basis of a Vehicle Shared Key, which is a shared key that all of the electronic control units in a vehicle share, and a counter (210).

In this case, the VSK is loaded in all of controllers as a key to be used for the purpose of common security in a vehicle and may be kept in a safe storage such as a Hardware Security Module (HSM) in a controller and a Trusted Execution Environment (TEE).

In this case, the counter may be defined as a resister or a storage device that is used to show the number of times of occurrence of a specific event. When a next input signal or input pulse is received in an existing state, the counter may be stored as a new value by increasing an existing value by 1.

Further, the first controller 210 creates an encoded message on the basis of the message created in step S205 and the MAC created in step S210 (S215) and transmits the created encoded message to the gateway 230 (S220).

In this case, the encoded message may be a payload control MAC message obtained by adding a counter value and the MAC to a payload in the created message.

When receiving the encoded message from the first controller 210 (S220), the gateway 230 determines whether the message identifier (ID) of the received encoded message exists in a blocking table for blocking messages (S225), and transmits the encoded message to the second controller 250 when the message ID of the received encoded message does not exist in the blocking table (S230).

In this case, the gateway 230 can transmit the encoded message to the second controller 250 on the basis of a Routing DB (RDB).

In this case, the blocking table may have a data format shown in the following Table 1.

TABLE 1

| Message ID(Msg ID) | State |
|---|---|
| 0x2ed | Block |
| 0x051 | Block |
| 0x5df | Block |
| ... | |

Referring to Table 1, the blocking table includes two fields and the two fields may include a Message ID (Msg ID) and a State.

In this case, when the state has a 'Block' value, the gateway 230 determines whether the Identified (ID) of the encoded message received from the first controller 210 coincide with an ID value indicated by the message ID field, and can block the encoded message without routing the encoded message to the second controller 250 when they coincide.

In this case, the blocking table is stored only during the current driving cycle of a vehicle and may be reset when the current driving cycle is ended or the next driving cycle is started.

When receiving the encoded message from the gateway 230 (S230), the second controller 250 creates a virtual MAC for verification on the basis of the encoded message received from the gateway 230 and the Vehicle Shared Key (VSK) (S235).

When the virtual MAC for verification is created, the second controller 250 determines whether the MAC in the encoded message received from the gateway 230 and the virtual MAC for verification coincide (S240), and decodes the encoded message when the MAC in the received encoded message and the virtual MAC for verification coincide (S255).

In this case, operation, etc. corresponding to the decoded message can be performed by the second controller 250.

In this case, the operation corresponding to the message may be performed in an application installed in the second controller 250.

Meanwhile, the second controller 250 transmits a feedback message to the gateway 230 when the MAC in the encoded message received from the gateway 230 and the virtual MAC for verification do not coincide as the result of determination in step S240 (S245).

In this case, the feedback message may be a message related to the encoded message received from the gateway 230.

In this case, the feedback message may have a data format shown in the following Table 2.

TABLE 2

| Data Byte (A_Data byte) | Parameter Name | Byte Value |
|---|---|---|
| #1 | Verification Feedback message | $11_{16}$ |
| 2 | Verifying Failed message ID | $02_{16}$ |
| #3 | | $ED_{16}$ |
| 4 | Flag of verifying message [ ] = [Verification Fail: FF Verification Error: 00] | $FF_{16}$ |
| 5~#12 | MAC of Feedback message [ ] = [ | |
| | byte#1 (MSB) | $XX_{16}$ |
| | byte#2 | $XX_{16}$ |
| | byte#3 | $XX_{16}$ |
| | byte#4 | $XX_{16}$ |
| | byte#5 | $XX_{16}$ |
| | byte#6 | $XX_{16}$ |
| | byte#7 | $XX_{16}$ |
| | byte#8 | $XX_{16}$ |

Referring to FIG. 2, a feedback message may be a message having a size of 12 bytes and may include at least one or more of a field indicating that the feedback message is a verification feedback message, a field indicating the identifier (ID) of the encoded message, a field including the flag for the result of verifying the encoded message, or a field including a Message Authentication Code (MAC) value for the feedback message, or a combination thereof.

In this case, the feedback message may include at least one of 'Verification Feedback message', 'Verifying Failed message ID', 'Flag of verifying message', or 'MAC of Feedback message', or a combination thereof.

The 'Verification Feedback message' that is the first field is composed of the first byte (#1) of a feedback message and may have a value of '1116'. The first field indicates that the feedback message is a verification feedback message.

The 'Verifying Failed message ID' that is the second field is composed of the second and third bytes (#2 and #3) of a feedback message and indicates the identifier (ID) of an encoded message. In this case, information about the message ID may be a CAN with flexible data rate (CAN-FD) message ID of 11 bits. However, the information about the message ID shows not a message ID for a feedback message, but a message ID for an encoded message that has been received from a gateway and verified by the second controller 250 and has failed in verification.

For example, when the ID of an encoded message that has failed in verification is 0x2ed, 2 bytes constituting the second field may be '$02_{16}$' and '$ED_{16}$'.

Meanwhile, the 'Flag of verifying message' that is the third field is composed of the fourth (#4) byte of a feedback message and includes a flag related to the result of verifying an encoded message.

In this case, when verification fails as the result of normally verifying an encoded message by the second controller 250, the third field has a value of '$FF_{16}$'.

Meanwhile, when an error is generated while the second controller verifies an encoded message, the third field has a value of '$00_{16}$'.

In this case, when the third field in the feedback message has a value of '$00_{16}$', the gateway 230 does not specifically preclude routing. However, such a feedback message may be stored in a gateway and used later to examine whether a controller can perform MAC verification (read data).

Meanwhile, the 'MAC of Feedback message' that is the fourth field includes a MAC value using the VSK for a feedback message.

In this case, input for the MAC value may be entire plain text message data.

In this case, the fourth field may not include a message counter.

Meanwhile, the second controller 250 can verify whether the MAC in the encoded message and the virtual MAC for verification coincide over a predetermined number of times set in advance, and can transmit a feedback message to the gateway 230 when they do not coincide over the predetermined number of times.

For example, the second controller 250 can verify whether the MAC in the encoded message and the virtual MAC for verification coincide over three times, and can transmit a feedback message to the gateway 230 when they do not coincide over three times.

In this case, when the MAC in the encoded message and the virtual MAC for verification do not coincide, the controller 250 may create again a virtual MAC for verification and verify whether the virtual MAC for verification coincide with the MAC in the encoded message over three times.

The gateway 230 updates the blocking table (S250) when receiving a feedback message from the second controller (S245).

In this case, the blocking table may have the data format shown in Table 1.

When receiving an encoded message from the first controller 210, the gateway 230, on the basis of the updated blocking table, can determine whether the ID of the received encoded message exists in the blocking table, and can route the received encoded message to the second controller 250 or can block the received encoded message without of the routing on the basis determination result.

Figure 3:
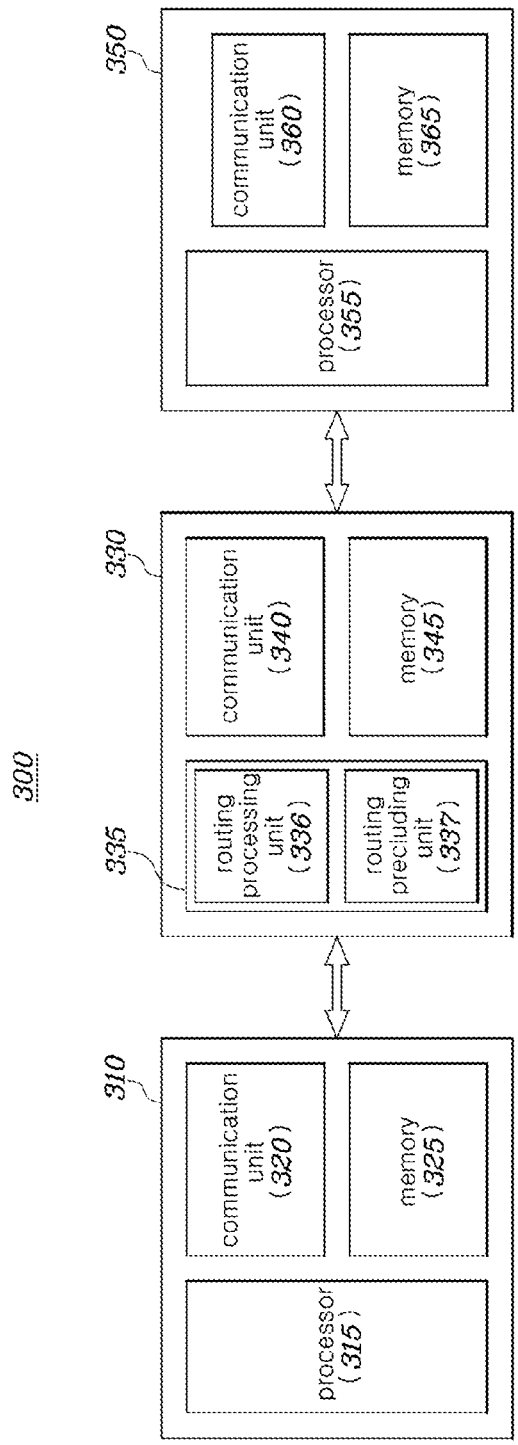
FIG. 3 is a block diagram schematically showing an example of the vehicle network system.

FIG. 3 is a block diagram schematically showing the vehicle network system.

Referring to FIG. 3, a vehicle network system 300 includes a first controller 310, a gateway 330, and a second controller 350.

The first controller 310 includes a processor 315, a communication unit 320, and a memory 325.

The processor 310 may include an ASIC (application-specific integrated circuit), another chipset, a logic circuit, and/or a data processing unit. The processor 310 implements the signal transmission and reception method proposed in this specification. The processor 310, in detail, creates an encoded message that is transmitted to a gateway.

In this case, the encoded message may be a payload control MAC message obtained by adding a counter value and a MAC to a payload in the created message.

The communication unit 320 is connected with the processor 315 and information transmits and/receives all of for implementing the signal transmission and reception method. For example, the communication unit 320 transmits an encoded message created by the processor 315 to the gateway 330.

The memory 325 may include a ROM (read-only memory), a RAM (random access memory), a flash memory, a memory card, a storage medium, and/or another storage unit. The memory 325 stores information for implementing the message transmission and reception method. For example, the memory 325 stores at least one or more of a message, a VSK, a counter, a MAC value, or an encoded message, or a combination thereof.

The gateway 330 includes a processor 335, a communication unit 340, and a memory 345.

The processor 335 may include an ASIC (application-specific integrated circuit), another chipset, a logic circuit, and/or a data processing unit. The processor 335 implements the signal transmission and reception method proposed in this specification. The processor 335 determines whether the message ID of an encoded message received from the first controller 310 exists in the blocking table.

Further, the processor 335 updates the blocking table on the basis of a feedback message received from the second controller 350.

Meanwhile, the processor 335 may include a routing processing unit 336 and a routing precluding unit 337.

The routing processing unit 336 routes an encoded message received from the first controller 310 on the basis of a routing DB (RDB).

The routing precluding unit 337 blocks routing of an encoded message received from the first controller 310 on the basis of a blocking table.

In this case, the blocking table may have the data format shown in Table 1.

The communication unit 340 is connected with the processor 335 and and/receives transmits all of information for implementing the signal transmission and reception method. For example, the communication unit 340 routes an encoded message routed by the processor or blocks an encoded message precluded from being routed without routing it.

The memory 345 may include a ROM (read-only memory), a RAM (random access memory), a flash memory, a memory card, a storage medium, and/or another storage unit. The memory 345 stores information for implementing the message transmission and reception method. For example, the memory 345 stores at least one or more of an encoded message, a routing DB, a blocking table, or a feedback message, or a combination thereof.

The second controller 350 includes a processor 355, a communication unit 360, and a memory 365.

The processor 355 may include an ASIC (application-specific integrated circuit), another chipset, a logic circuit, and/or a data processing unit. The processor 355 implements the signal transmission and reception method proposed in this specification. The processor 355, in detail, creates a feedback message that is transmitted to a gateway.

In this case, the feedback message may have a data format shown in Table 2.

The communication unit 360 is connected with the processor 355 and transmits and/receives all of information for implementing the signal transmission and reception method. For example, the communication unit 360 transmits a feedback message created by the processor 355 to the gateway 330.

The memory 365 may include a ROM (read-only memory), a RAM (random access memory), a flash memory, a memory card, a storage medium, and/or another storage unit. The memory 365 stores information for implementing the message transmission and reception method. For example, the memory 365 stores at least one or more of a VSK, a counter, a MAC value, or an encoded message, or a combination thereof.

According to the implementations of the present disclosure described above, it is possible to quickly filter out forged messages without performing integrity verification at a gateway.

Further, it is possible to quickly filter out forged messages even without performing integrity verification at a gateway.

The invention claimed is:

1. A message transmission and reception method performed at a gateway configured to receive a message from a first controller and transmit the message to a second controller in a vehicle network, the message transmission and reception method comprising:
   determining, based on an encoded message being received from the first controller, whether a message identifier (ID) of the encoded message is present within a blocking table; and
   transmitting, based on a determination that the message ID of the encoded message being absent in the blocking table, the encoded message to the second controllers,
   wherein the blocking table is stored during a current driving cycle of a vehicle and is configured to, based on the current driving cycle being ended or a next driving cycle being started, be reset.

2. The message transmission and reception method of claim 1, further comprising:
   receiving a feedback message related to the encoded message from the second controller; and
   updating the blocking table based on the feedback message.

3. The message transmission and reception method of claim 2, wherein the feedback message includes at least one of a field indicating that the feedback message is a verification feedback message, a field indicating an ID of the encoded message, a field including a flag for a verification result of the encoded message, or a field including a Message Authentication Code (MAC) value for the feedback message.

4. The message transmission and reception method of claim 3, wherein the feedback message has a size of 12 bytes, the field indicating that the feedback message is a verification feedback message has a size of 1 byte, the field indicating an ID of the encoded message has a size of 2 bytes, the field including a flag for the verification result of the encoded message has a size of 1 byte, and the field including a MAC value for the feedback message has a size of 8 bytes.

5. The message transmission and reception method of claim 3, wherein, based on the field indicating that the feedback message is a verification feedback message having a value of '11', the field indicates that the feedback message is a verification feedback message.

6. The message transmission and reception method of claim 3, wherein the field indicating an ID of the encoded message includes ID information for a message that has failed in verification based on the verification result from the second controller.

7. The message transmission and reception method of claim 3, wherein the field including a flag for the verification result of the encoded message has a value of 'FF' or '00',
   wherein the 'FF' value indicates that the encoded message has failed in verification after a verification process of the encoded message, and
   wherein the '00' value indicates that an error occurred during the verification process of the encoded message.

8. The message transmission and reception method of claim 1, wherein the blocking table includes a plurality of message ID fields and a plurality of state fields.

9. The message transmission and reception method of claim 8, wherein, based on a state field associated with a message ID field that has an ID identical to the ID of the encoded message having a block value, the encoded message is blocked from being routed to the second controller.

10. A gateway comprising:
    a communication unit configured to:
      receive an encoded message from a first controller, and transmit, based on a message identifier (ID) of the encoded message being absent in a blocking table, the encoded message to a second controller; and
    a processor configured to determine whether the message ID of the encoded message is present within the blocking table,
    wherein the blocking table is stored during a current driving cycle of a vehicle and is configured to, based on the current driving cycle being ended or a next driving cycle being started, be reset.

11. The gateway of claim 10, wherein the communication unit is configured to receive a feedback message related to the encoded message from the second controller, and
    wherein the processor is configured to update the blocking table based on the feedback message.

12. The gateway of claim 11, wherein the feedback message includes at least one of a field indicating that the feedback message is a verification feedback message, a field indicating an ID of the encoded message, a field including a flag for a verification result of the encoded message, or a field including a Message Authentication Code (MAC) value for the feedback message.

13. The gateway of claim 12, wherein the feedback message has a size of 12 bytes, the field indicating that the feedback message is a verification feedback message has a size of 1 byte, the field indicating an ID of the encoded message has a size of 2 bytes, the field including a flag for the verification result of the encoded message has a size of 1 byte, and the field including a MAC value for the feedback message has a size of 8 bytes.

14. The gateway of claim 12, wherein, based on the field indicating that the feedback message is a verification feedback message having a value of '11', the field indicates that the feedback message is a verification feedback message.

15. The gateway of claim 12, wherein the field indicating an ID of the encoded message includes ID information for a message that has failed in verification based on the verification result from the second controller.

16. The gateway of claim 12, wherein the field including a flag for the verification result of the encoded message has a value of 'FF' or '00',
    wherein the 'FF' value indicates that the encoded message has failed in verification after a verification process of the encoded message, and
    wherein the '00' value indicates that an error occurred during the verification process of the encoded message.

17. The gateway of claim 10, wherein the blocking table includes a plurality of message ID fields and a plurality of state fields.

18. The gateway of claim 17, wherein the processor is configured to, based on a state field associated with a message ID field that has an ID identical to the ID of the encoded message having a block value, block the encoded message from being routed to the second controller.

* * * * *